April 14, 1931.  F. DUSTAN ET AL  1,800,443
SIDE SCRAP DEFLECTOR
Filed Nov. 2, 1929
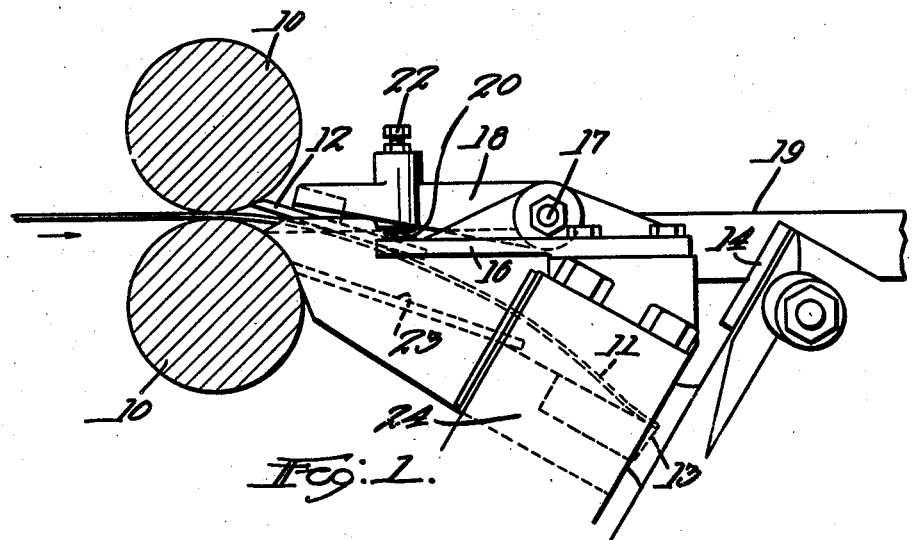
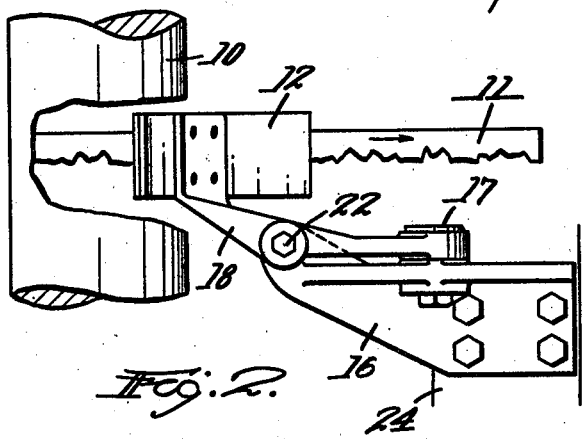
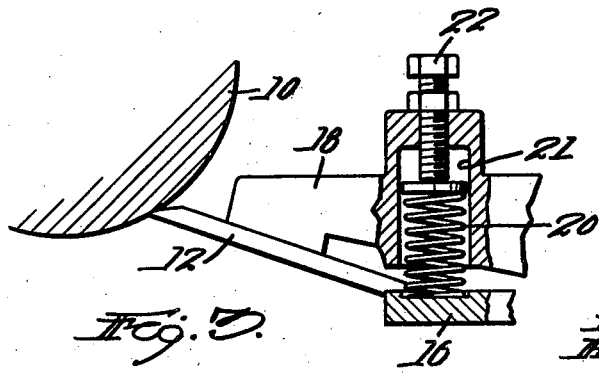

Patented Apr. 14, 1931

1,800,443

UNITED STATES PATENT OFFICE

FRANK DUSTAN AND HARRY W. CROSS, OF WILKINSBURG, PENNSYLVANIA, ASSIGNORS TO MANNING, MAXWELL & MOORE, INC., OF NEW YORK, N. Y., A CORPORATION OF NEW JERSEY

SIDE-SCRAP DEFLECTOR

Application filed November 2, 1929. Serial No. 404,460.

This invention relates to a device for deflecting the side scrap from the delivery rolls of a machine for shearing the rough edges from the side of a sheet or pack of metal.

The principal objects of the invention are to provide efficient means for insuring the detachment and removal of the side scrap from the upper roll of a pair of delivery rolls, and at the same time guide the side scrap downwardly into proper position for chopping it up into small pieces; and to provide yielding means for holding a blade up against the lower side of the upper delivery roll so that it will be effective for the purpose above described.

Other objects and advantages of the invention will appear hereinafter.

Reference is to be had to the accompanying drawings in which

Fig. 1 is a side elevation of the two delivery rolls of a rotary machine for trimming the side edges of a sheet or pack of metal, showing a preferred form of this invention applied thereto;

Fig. 2 is a plan of the same; and

Fig. 3 is a sectional view on enlarged scale of the spring-pressed scraper.

This invention is designed to be applied to a machine having a pair of delivery rolls 10 which deliver the sheet or pack of metal and its side scrap 11. The rolls feed the sheet or pack of metal out on a table 19, in a horizontal direction. The side scrap 11 is acted on by a scraper 12 and delivered down to a cutting blade 13 where the scrap is chopped up into small pieces by another blade or blades 14 cooperating with the blade 13.

The hardened steel cover plates ordinarily employed on the cutter heads form effective side guides for the scrap. On the chopper housings are studs 17 arranged with their axes parallel with the axes of the delivery rollers 10, and to these studs are hinged arms 18 which carry at their ends the scrapers 12. These have been described in the plural because one is used on each side of the machine, but only one is shown herein.

On the housing is a bracket 16 on which rests a spring 20 located in a recess 21 in the bottom of the pivoted arm 18. A screw 22 extends through this arm and receives pressure from the spring. This screw can be adjusted to regulate the amount of pressure, and it will be obvious that as the bracket 16 is stationary and the spring presses the pivoted arm 18 upwardly, the scraper will press with whatever degree of force is desired against the lower, delivery, side of the upper delivery roll 10. This scraper serves the purpose of preventing any of the scrap, either in small or large pieces, from being carried around the upper roll and causing it all to be separated therefrom and delivered downward.

Any small pieces of scrap falling from the upper roll will fall on a stationary scraper 23 which engages the lower roll on the upper or delivery side, and also this scraper will loosen any scrap, if any should come around on it and tend to pass around the roll. This scraper 23 is mounted on a stationary member 24 which carries the blade 13.

The scrap 11 deflected by the scraper 12 in its ordinary passage through the machine will be guided or bent around so as to rest on the surface of the blade 13 which is arranged at an inclination, practically tangent to the lower roll 10, and therefore its upper surface serves as a table to receive the scrap. The scrap passes out over the edge of this blade and is cut off in small lengths by the blade 14.

The scrap is properly deflected so that it will come in proper position for cutting off, and the parts constituting the means for accomplishing this are of simple and strong construction and all classes of side scrap are unfailingly guided into the chopper. Moreover, no scrap or scale of any consequence can pass the two blades 12 and 23 and go around the rolls. The scraper 12 is held up against the upper roll with an adjustable degree of elasticity so that it will perform its function and yet not injure the surface of the roll.

Although we have illustrated and described only a single form of the invention, we are aware of the fact that changes can be made therein by any person skilled in the art without departing from the scope of the invention as expressed in the claims. Therefore we do not wish to be limited to the exact form shown, but what we do claim is:—

1. In a scrap deflector, the combination with a pair of delivery rolls and a horizontal table on which the sheets or packs are delivered from the delivery rolls of a scraper at one end of the pair of rolls for engaging the scrap and deflecting it downwardlly from said table at the side thereof, and yielding means for pushing said scraper upwardly against the upper delivery roll.

2. In a scrap deflecting device, the combination with a pair of delivery rolls, of a scraper at the end of the rolls engaging the delivery side of one of the rolls located at an angle to the normal direction of movement of the scrap for bending the scrap out of a straight path, a pivoted arm on which the scraper is mounted, and yielding means for pressing said arm in a direction to cause the scraper to bear with a yielding pressure on the delivery roll.

In testimony whereof we have hereunto affixed our signatures.

FRANK DUSTAN.
HARRY W. CROSS.